(12) United States Patent
Mutnuru

(10) Patent No.: US 11,334,453 B2
(45) Date of Patent: May 17, 2022

(54) SYSTEM AND METHOD FOR PROVIDING FAULT TOLERANCE AND RESILIENCY IN A CLOUD NETWORK

(71) Applicant: ORACLE INTERNATIONAL CORPORATION, Redwood Shores, CA (US)

(72) Inventor: Rishi Mutnuru, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/935,961

(22) Filed: Jul. 22, 2020

(65) Prior Publication Data

US 2021/0349796 A1 Nov. 11, 2021

Related U.S. Application Data

(60) Provisional application No. 63/021,564, filed on May 7, 2020.

(51) Int. Cl.
*G06F 11/07* (2006.01)
*G06F 11/20* (2006.01)
(Continued)

(52) U.S. Cl.
CPC ...... *G06F 11/2028* (2013.01); *G06F 11/3006* (2013.01); *H04L 41/0816* (2013.01);
(Continued)

(58) Field of Classification Search
CPC .............. G06F 11/3006; G06F 11/301; G06F 11/2028; G06F 2201/86; H04L 41/0816; H04L 41/0893; H04L 67/1034
(Continued)

(56) References Cited

U.S. PATENT DOCUMENTS 7,788,522 B1 * 8/2010 Abdelaziz ............... H04L 41/12
714/4.1
9,626,261 B2 * 4/2017 Ren ...................... G06F 11/2028
(Continued)

FOREIGN PATENT DOCUMENTS

CN 103929323 7/2014
CN 105656715 6/2016
(Continued)

OTHER PUBLICATIONS

Gill, et al., "Understanding Network Failures in Data Centers: Measurement, Analysis, and Implications", SIGCOMM 11, Aug. 15-19, 2011, retrieved from https://www.microsoft.com/en-us/research/wp-content/uploads/2017/01/sigcomm11netwiser.pdf, 12 pages.
(Continued)

*Primary Examiner* — Chae M Ko
(74) *Attorney, Agent, or Firm* — Tucker Ellis LLP

(57) ABSTRACT

In accordance with an embodiment, described herein is a system and method for providing fault tolerance and resiliency within a cloud network. A cloud computing environment provides access, via the cloud network, to software applications executing within the cloud environment. The cloud network can include a plurality of network devices, of which various network devices can be configured as virtual chassis devices, cluster members, or standalone devices. A fault tolerance and resiliency framework can monitor the network devices, to receive status information associated with the devices. In the event the system determines a failure or error associated with a network device, it can attempt to perform recovery operations to restore the cloud network to its original capacity or state. If the system determines that a particular network device cannot recover from the failure or error, it can alert an administrator for further action.

12 Claims, 16 Drawing Sheets

(51) Int. Cl.
　　*H04L 41/0893* (2022.01)
　　*H04L 67/1034* (2022.01)
　　*G06F 11/30* (2006.01)
　　*H04L 41/0816* (2022.01)
(52) U.S. Cl.
　　CPC ...... *H04L 41/0893* (2013.01); *H04L 67/1034* (2013.01); *G06F 2201/86* (2013.01)
(58) Field of Classification Search
　　USPC .......................................... 714/4.1, 4.11, 6.3
　　See application file for complete search history.

(56) References Cited

U.S. PATENT DOCUMENTS

| | | | | |
|---|---|---|---|---|
| 2011/0239039 A1* | 9/2011 | Dieffenbach | ......... | H04L 41/082 714/4.1 |
| 2013/0268495 A1* | 10/2013 | Thiel | ....................... | G06F 11/20 707/691 |
| 2014/0040671 A1* | 2/2014 | Akirav | ................ | G06F 11/0778 714/45 |
| 2015/0149814 A1* | 5/2015 | Ren | ..................... | G06F 11/0703 714/4.11 |
| 2017/0118041 A1* | 4/2017 | Bhattacharya | ...... | H04L 41/5054 |
| 2018/0054475 A1 | 2/2018 | Agarwal et al. | | |
| 2018/0077576 A1* | 3/2018 | Ngo | ........................ | H04W 4/80 |
| 2019/0028346 A1* | 1/2019 | Pallas | ................. | H04L 41/0869 |
| 2019/0238399 A1* | 8/2019 | Perreira | ............. | G06F 11/1425 |
| 2020/0104161 A1* | 4/2020 | Kapur | ................. | G06F 11/2025 |

FOREIGN PATENT DOCUMENTS

| | | | | |
|---|---|---|---|---|
| CN | 110535710 | | 12/2019 | |
| EP | 2737411 | | 6/2014 | |
| WO | 2013016584 | | 1/2013 | |
| WO | WO-2014190510 A1 * | 12/2014 | ............ | H04W 28/16 |
| WO | WO-2018151112 A1 * | 8/2018 | ............. | H04L 12/66 |

OTHER PUBLICATIONS

Juniper Networks, "Junos Space Network Director: Network Director User Guide, Release 3.5", modified Aug. 26, 2019, retrieved from https://www.juniper.net/documentation/en_US/junos-space-apps/network-director3.5/information-products/pathway-pages/network-director-pwp.pdf, 1400 pages.

Juniper Networks, "Junos Space Network Director Product Description", Jul. 2019, retrieved from https://www.juniper.net/assets/us/en/local/pdf/datasheets/1000428-en.pdf, 7 pages.

Meza, et al., "A Large Scale Study of Data Center Network Reliability", IMC '18, Oct. 31-Nov. 2, 2018, retrieved from https://people.inf.ethz.ch/omutlu/pub/data-center-network-errors-at-facebook_imc18.pdf, 10 pages.

Juniper Networks; Virtual Chassis User Guide for Switches "Removing or Replacing a Member Switch of a Virtual Chassis Configuration"; Retrieved from <https://www.juniper.net/documentation/en_us/junos/topics/task/installation/virtual-chassis-ex4200-member-replacing-cli.html> on Dec. 10, 2020; 8 pages.

Juniper Networks; Chassis Cluster User Guide for SRX Series Devices "Set chassis cluster cluster-id node node-number reboot"; Retrieved from <https://www.juniper.net/documentation/us/en/software/junos/chassis-cluster-security-devices/topics/ref/command/set-chassis-cluster-clusterid-node-reboot.html> on Mar. 10, 2021; 2 pages.

Juniper Networks; Virtual Chassis Fabric User Guide "Adding a Device to a Virtual Chassis Fabric"; Retrieved from <https://www.juniper.net/documentation/us/en/software/junos/virtual-chassis-fabric/topics/task/vcf-adding-device.html> on Dec. 17, 2021; 13 pages.

Juniper Networks; Virtual Chassis Fabric User Guide "Verifying the Member ID, Role, Status, and Neighbor Member Connections of a Virtual Chassis Fabric Member Device"; Retrieved from <https://www.juniper.net/documentation/us/en/software/junos/virtual-chassis-fabric/topics/task/virtual-chassis-fabric-member-id.html> on Dec. 17, 2021; 2 pages.

* cited by examiner

Device Inventory 220 (Example)

| Asset_ID | Asset Name | Serial No. | Vendor | Model | Version | Cluster | Lifecycle Status | Additional Information |
|---|---|---|---|---|---|---|---|---|
| 405832 | A.cloud.com | C902804 | Cisco | ASA-5585-X | 3 | TRUE | Deployed | ... |
| 904321 | B.cloud.com | J1234202 | Juniper | QFX5000 | 4 | FALSE | Decommisioned | ... |
| 634324 | N.cloud.com | A2342327 | (Other) | (Other) | ... | ... | ... | ... |
| ... | ... | ... | ... | ... | | | | |

*FIGURE 3*

SYSTEM AND METHOD FOR PROVIDING FAULT TOLERANCE AND RESILIENCY IN A CLOUD NETWORK

CLAIM OF PRIORITY

This application claims the benefit of priority to U.S. Provisional Patent Application titled "SYSTEM AND METHOD FOR PROVIDING FAULT TOLERANCE AND RESILIENCY IN A CLOUD NETWORK", Application No. 63/021,564, filed May 7, 2020; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer networks, network devices, and cloud computing environments, and are particularly related to systems and methods for providing fault tolerance and resiliency in a cloud network.

BACKGROUND

A cloud computing environment or cloud network typically comprises a large amount of heterogeneous network devices, such as for example, firewalls, load balancers, routers, switches, power distribution units, or other types of network devices, appliances, or components operating according to various different protocols.

Network devices may be sourced from various device vendors; with each device type or model assigned to a particular role. For example, a cloud computing environment or cloud network may comprise a variety of fabric, spine, and leaf node devices, sourced from a variety of different vendors. In some environments, network devices can be configured as virtual chassis devices, cluster members, or standalone network devices.

However, network devices are susceptible to hardware or software failures or errors. Examples of potential hardware errors can include non-maskable interrupt (NMI) errors, parity errors, or application-specific integrated circuit (ASIC) errors; while examples of potential software errors can include problems with software daemons, operating system subsystems, or service blades running specialized software for add-on services.

Some failures or errors may be catastrophic, in that they disrupt mission-critical software applications running in the cloud environment. As such, to achieve high availability and continuity of applications running in the cloud, there is an incentive to build fault tolerance and resiliency into the cloud network. However, since cloud providers often utilize network devices sourced from several third-party network device manufacturers or vendors, there is a challenge in providing resiliency in a cloud network that can handle hardware or software failures across a wide variety of network devices.

SUMMARY

In accordance with an embodiment, described herein is a system and method for providing fault tolerance and resiliency within a cloud network. A cloud computing environment provides access, via the cloud network, to software applications executing within the cloud environment. The cloud network can include a plurality of network devices, of which various network devices can be configured as virtual chassis devices, cluster members, or standalone devices. A fault tolerance and resiliency framework can monitor the network devices, to receive status information associated with the devices. In the event the system determines a failure or error associated with a network device, it can attempt to perform recovery operations to restore the cloud network to its original capacity or state. If the system determines that a particular network device cannot recover from the failure or error, it can alert an administrator for further action.

BRIEF DESCRIPTION OF THE DRAWINGS

FIG. 3 illustrates an example of a network device inventory, in accordance with an embodiment.

DETAILED DESCRIPTION

As described above, a cloud computing environment or cloud network typically comprises a large amount of heterogeneous network devices, such as for example, firewalls, load balancers, routers, switches, power distribution units, or other types of network devices, appliances, or components operating according to various different protocols.

To achieve high availability and continuity of applications running in the cloud, there is an incentive to build fault tolerance and resiliency into the cloud network. However, since cloud providers often utilize network devices sourced from several third-party network device manufacturers or vendors, there is a challenge in providing resiliency in a cloud network that can handle hardware or software failures across a wide variety of network devices.

In accordance with an embodiment, described herein is a system and method for providing fault tolerance and resiliency within a cloud network. A cloud computing environment provides access, via the cloud network, to software applications executing within the cloud environment. The cloud network can include a plurality of network devices, of which various network devices can be configured as virtual chassis devices, cluster members, or standalone devices.

In accordance with an embodiment, a fault tolerance and resiliency framework can monitor the network devices, to receive status information associated with the devices. In the event the system determines a failure or error associated with a network device, it can attempt to perform recovery operations to restore the cloud network to its original capacity or state. If the system determines that a particular network device cannot recover from the failure or error, it can alert an administrator for further action.

In accordance with various embodiments, technical advantages of the systems and methods described herein include, for example, that the fault tolerance and resiliency framework is adapted to monitor and remediate faults spanning potentially thousands of network devices within a cloud network, to provide fault tolerance and resiliency within such an environment.

Figure 1:
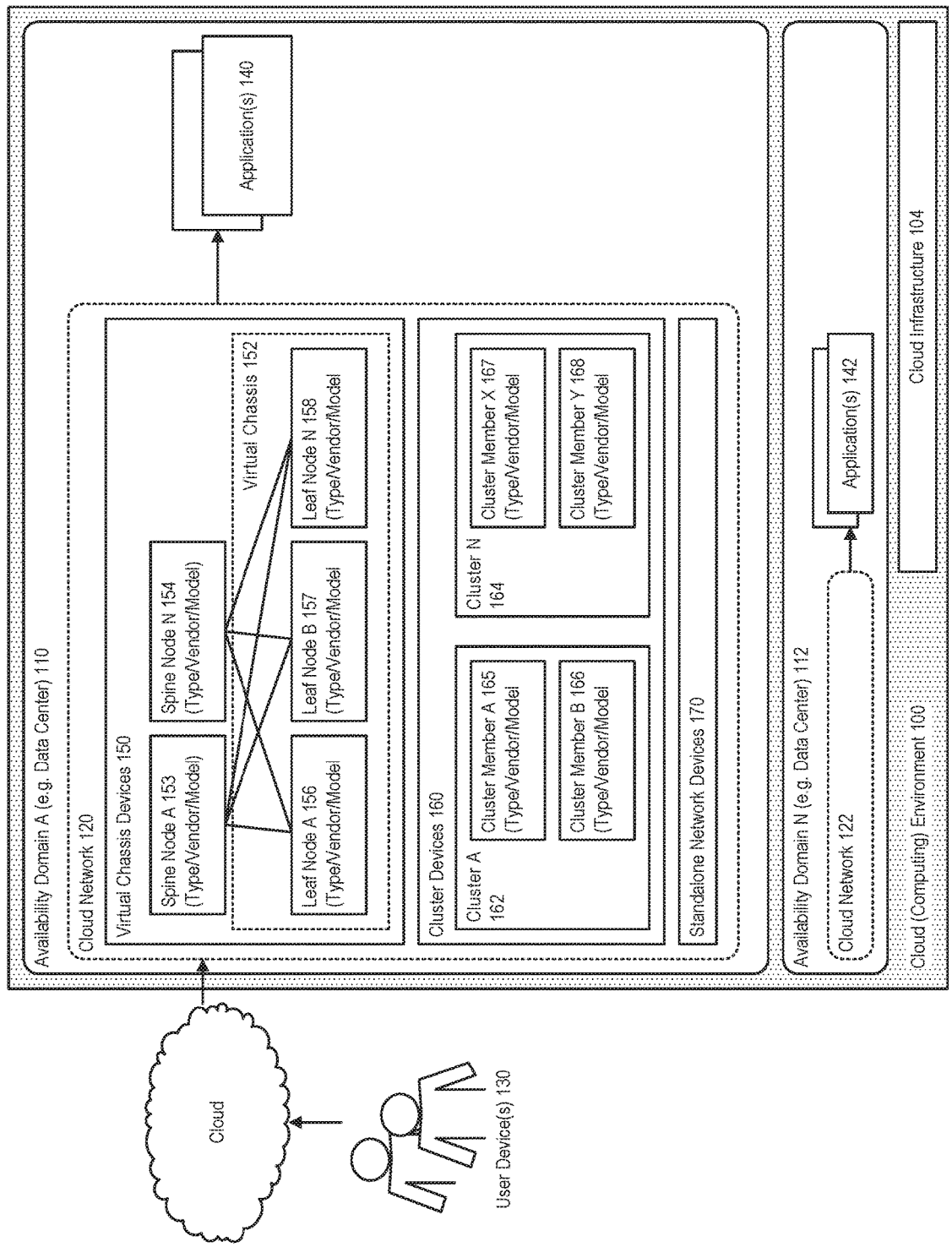
FIG. 1 illustrates an example cloud computing environment, including an availability domain and cloud network, in accordance with an embodiment.

FIG. 1 illustrates an example cloud computing environment, including an availability domain and cloud network, in accordance with an embodiment.

As illustrated in FIG. 1, in accordance with an embodiment, a cloud computing environment (cloud environment) 100, including a cloud infrastructure 104 having computing hardware or devices, can provide access, via a cloud network 120, to software applications 140 executing within an availability domain A 110 (for example, as provided at a data center) of the cloud environment.

For example, in accordance with an embodiment, the cloud environment can provide access by one or more user devices 130 or computers to the applications. Other availability domains, for example availability domain N 112, can be similarly associated with another cloud network 122, or applications 142.

In accordance with an embodiment, the cloud network can include a plurality of network devices, of which particular network devices can be configured as virtual chassis devices 150, cluster devices 160, or standalone network devices 170.

For example, in accordance with an embodiment, in the environment illustrated in FIG. 1, which is provided for purposes of illustration, a cloud network can include a virtual chassis (VC) 152 having a plurality of spine nodes 153, 154, and leaf nodes 156, 157, 158, each of which network devices can be associated with a network device type, vendor, or model information.

As further illustrated in this example, the cloud network can include a plurality of clusters 162, 164, which in turn can include a plurality of cluster members 165, 166, 167, 168, each of which can similarly be associated with a network device type, vendor, or model information.

In accordance with an embodiment, a cloud network can include a variety of fabric, spine, and leaf nodes, for example switches, wherein the leaf nodes connect to other network devices such as firewalls, load balancers, routers, or servers. In some environments, leaf nodes or devices can be provisioned as part of a virtual chassis; while fabric or spine nodes or devices can be provisioned either as part of a virtual chassis or as standalone devices. Firewalls and load balancers are typically configured as clusters.

The example illustrated in FIG. 1 is provided for purposes of illustration. In accordance with various embodiments, a cloud network may include either some or all of the components illustrated therein, or may include only a selection of, for example, leaf nodes or cluster members.

For example, in accordance with an embodiment, a cloud environment may include a cloud network that is built using network devices from several third-party network device manufacturers or vendors, intended for use within an availability domain within a data center. Such a cloud environment must scale and operate without failure, to provide application continuity or high availability. Although switches and clusters can occasionally fail, this should preferably not have an effect on the applications, and instead the system should be able to accommodate or tolerate such failures or errors.

In cloud environments or cloud networks that include a cluster, configuration information can be duplicated to all of the network devices in that cluster; so that each cluster member includes all of the information needed to provide the functions of that cluster. Clusters are typically scalable, for example from 2 members/nodes to 4 members/nodes; and typically operate in an active-active mode, with all of the cluster members active at the same time. This provides devices such as firewalls and load balancers that are configured as clusters with a measure of built-in redundancy. However, an administrator generally has to manually add or delete cluster members/nodes.

In cloud environments or cloud networks that include a virtual chassis, a particular network device within the virtual chassis can assume the role of a control module, while remaining network devices assume roles of line cards that process data. Such a virtual chassis generally operates in an active-standby mode, wherein at least one network device is in a standby mode. If the device presently operating as the control module fails, then another device takes over as the control module. This similarly provides a virtual chassis with a measure of built-in redundancy. However as with the cluster scenario described above, with a virtual chassis the administrator generally has to manually specify the active-passive network devices.

In accordance with an embodiment, to address scenarios such as the above, the system described herein provides an automated means to, for example, add standby leaf nodes as replacements, rectify faulty components, and generate alerts for non-recoverable errors, using a fault tolerance and resiliency framework to achieve fault tolerance and resiliency at various granular parts of cloud networks, which includes network devices, hardware components (for example, line cards, ASIC, power supplies), and software subsystems.

Generally described, the described fault tolerance and resiliency framework can provide an approach to fault tolerance and resiliency for cloud networks that generally includes: (a) detecting broken network devices in a virtual chassis (e.g., leaf nodes) and/or clusters (e.g., firewall/load balancers) and replacing them with standby network devices; and (b) monitoring for catastrophic hardware/software errors, and taking appropriate actions.

Figure 2:
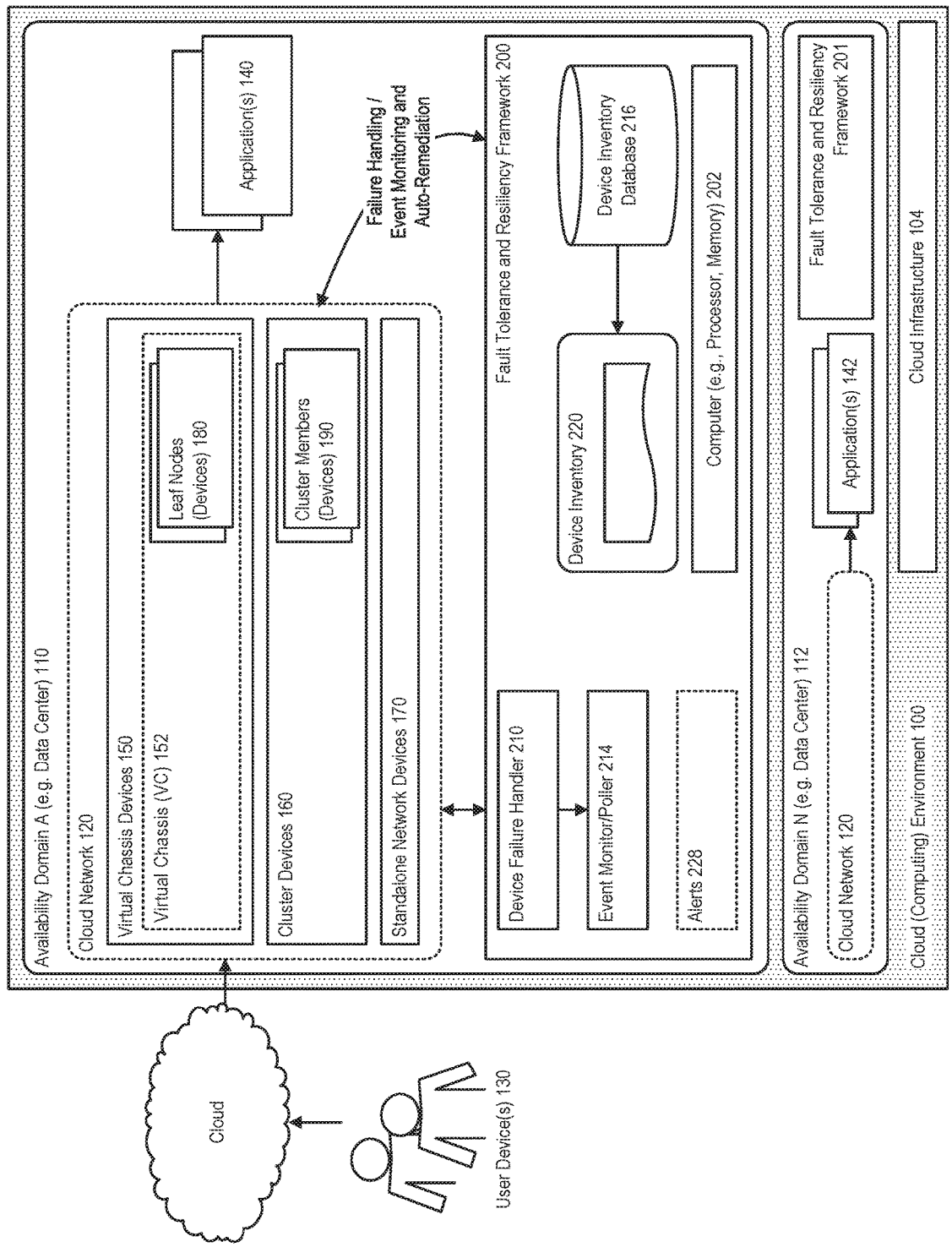
FIG. 2 illustrates a system for providing fault tolerance and resiliency in a cloud network, in accordance with an embodiment.

FIG. 2 illustrates a system for providing fault tolerance and resiliency in a cloud network, in accordance with an embodiment.

As illustrated in FIG. 2, in accordance with an embodiment, the system can include a fault tolerance and resiliency framework 200, that can operate at one or more computers 202 including a computer hardware (e.g., processor, memory), and can monitor network devices within a cloud network, such as for example, leaf nodes (devices) 180, cluster members (devices) 190, and standalone network devices, so as to receive status or state information associated with the devices.

In accordance with an embodiment, the fault tolerance and resiliency framework can include a device failure handler 210, and event monitor/poller 214 components, which can operate together to provide fault tolerance and resiliency; and can receive, from a network device inventory database 216, a network device inventory 220 or data descriptive of the various network devices in the cloud network, including their type, vendor, or model information.

In accordance with an embodiment, in the event the system determines a failure or error associated with a network device, it can attempt recovery operations to restore the cloud network to its original capacity or state. If the system determines that a particular network device cannot recover from the failure or error, it can use an alerts 228 component to alert an administrator for further action.

In accordance with an embodiment, the components and processes illustrated in FIG. 2, and as further described herein with regard to various other embodiments, can be provided as software or program code executable by a computer system or other type of processing device.

FIG. 3 illustrates an example of a network device inventory, in accordance with an embodiment.

As illustrated in FIG. 3, in accordance with an embodiment, a network device inventory can provide data descriptive of the various network devices in the cloud network, including their type, vendor, or model information, and their present lifecycle status or state.

The example illustrated in FIG. 3 is provided for purposes of illustration. In accordance with various embodiments, a network device inventory can include different types of vendor, model, or status or state information associated with network devices.

Figure 4:
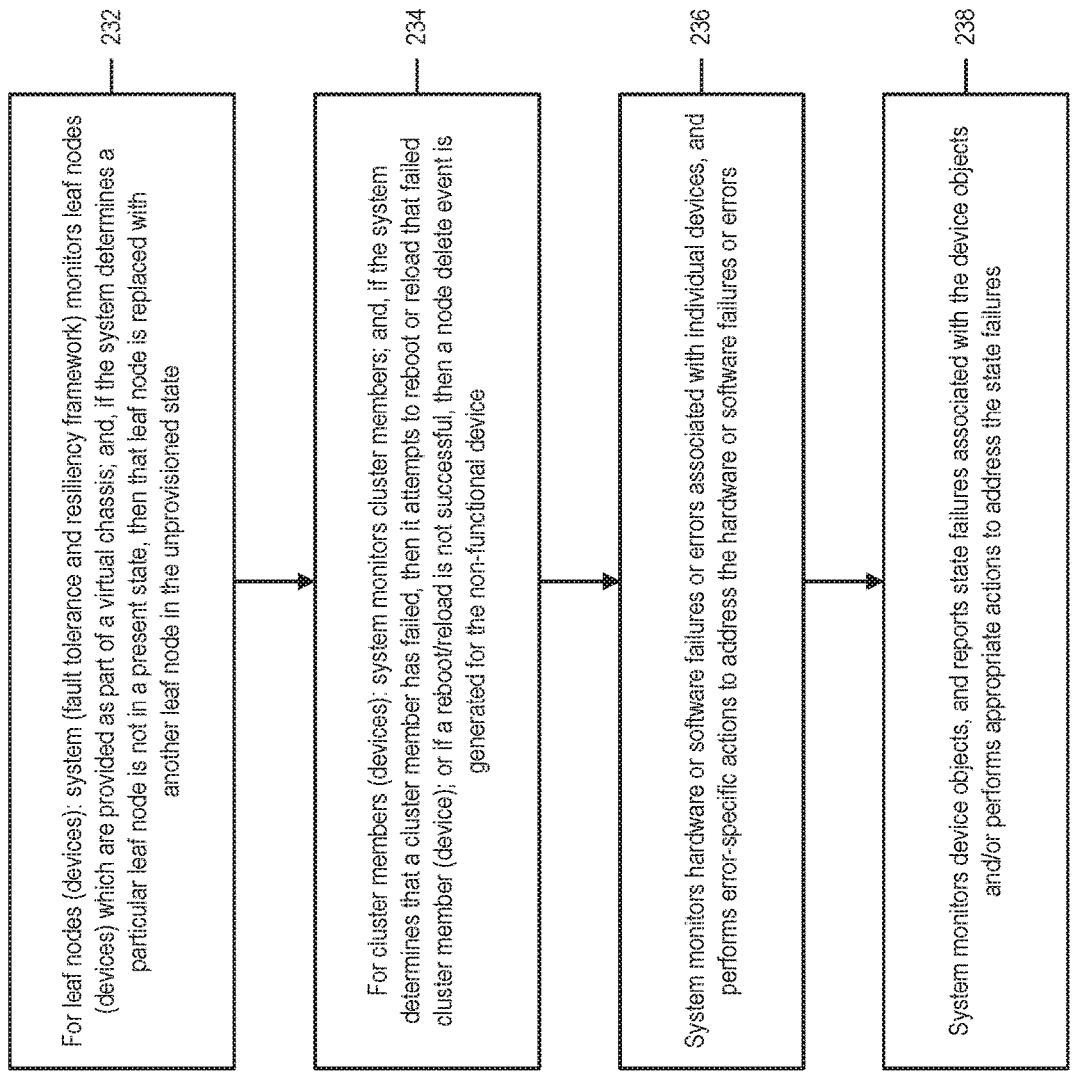
FIG. 4 illustrates a method or algorithm for providing fault tolerance and resiliency in a cloud network, in accordance with an embodiment.

FIG. 4 illustrates a method or algorithm for providing fault tolerance and resiliency in a cloud network, in accordance with an embodiment.

As illustrated in FIG. 4, in accordance with an embodiment, in a first aspect (232), for leaf nodes: the system (fault tolerance and resiliency framework) monitors leaf nodes which are provided as part of a virtual chassis; and, if the system determines a particular leaf node is not in a present state, then that leaf node is replaced with another leaf node in the unprovisioned state.

For example, in an environment that includes Juniper™ leaf nodes, the system can perform a "show virtual-chassis" command on all leaf node switches periodically, to detect if there are replacement switches that are not provisioned (unprovisioned), for example as in the following output:

0 (FPC 0) Present
TR0216320086 qfx5100-48t-6q 129 Master* N VC
0 vcp- 255/0/48
0 vcp- 255/0/49
1 (FPC 1) NotPresent
TR0216320093 qfx5100-48t-6q - Unprovisioned
TR0214480144 qfx5100-48t-6q In the above example, the system can determine, based on the output from running the command, that the switch with serial number TR0216320086 is the master switch; and the switch with serial number TR0216320093 should be replaced with the switch with serial number TR0214480144.

The above is provided by way of example and for purposes of illustration. In accordance with various embodiments that employ devices provided by other vendors, other types of commands can be used that are appropriate to those types of devices. Information provided by the device inventory database that identifies the device inventory and data descriptive of the various network devices in the cloud network, including their type, vendor, or model information, can be used to determine the device-type commands for use in configuring or otherwise operating with the various network devices.

In accordance with an embodiment, in a second aspect (234), for cluster members: the system can monitor cluster members; and, if the system determines that a cluster member has failed, then it attempts to reboot or reload that failed cluster member; or if a reboot/reload is not successful, then a node delete event is generated for the non-functional device. An administrator can then manually add another cluster member.

In accordance with an embodiment, in a third aspect (236): the system can monitor hardware or software failures or errors associated with individual network devices, and performs error-specific actions to address the hardware or software failures or errors For example, in accordance with an embodiment, example remedy techniques can include: for ASIC errors, performing operations to restart the ASIC; for parity errors, performing operations to restart a specific blade; for NMI errors, performing operations to reload the network device; for power supply/voltage/temperature critical events, performing operations to initiate leaf node replacement or cluster member removals; for standalone network devices, performing operations to generate critical alerts, or if action thresholds are reached, performing operations to shut down the network device; and for software errors, performing operations to generate alerts, or if the action thresholds are exceeded, performing operations to reboot the network device.

The above examples of various remedy techniques and operations are provided by way of example, and for purposes of illustration. In accordance with various embodiments, other types of remedy techniques and operations can be supported.

In accordance with an embodiment, in a fourth aspect (238): the system monitors device objects, and reports state failures associated with the device objects and/or performs appropriate actions to address the state failures.

In accordance with an embodiment, examples of the types of device objects that can be monitored include: expiration of SSL certificates for load balancers and firewalls; and virtual server or virtual IP (VIP) and pools on load balancers, for their status or state. The system can report such state failures; and in some embodiments attempt to automatically, for example, renew the expiring SSL certificates.

The above are provided by way of example, and for purposes of illustration. In accordance with various embodiments, other types of state failures can be supported.

In accordance with an embodiment, the system can recognize various thresholds as illustrated below, in monitoring the cloud network and providing fault-tolerance and resilience.

Alarm Threshold: In accordance with an embodiment, an alarm threshold can be configured to control the number of times that an event can be generated in a last (N) time interval defined before alerting the administrator. A value for "N" can be defined by cloud administrators per event; for critical events, this value will be 1.

Action Threshold: In accordance with an embodiment, an action threshold can be configured to control the number of times that an event can be generated in the last (N) time interval defined before taking the corrective action. A value for "N" can be defined by cloud administrators per event; for critical events, this value will be 1.

Restart Threshold: In accordance with an embodiment, a restart threshold can be configured to control the number of times that a faulty component can be restarted in the last (N) time interval defined before taking a system level action such as, for example, rebooting or isolating the component.

Reload Threshold: In accordance with an embodiment, a reload threshold can be configured to control the number of times a faulty network device can be reloaded in the last (N) time interval defined before isolating the network device from a virtual chassis or cluster, and initiating automatic network device replacement functionality.

In accordance with an embodiment, in each of the above scenarios, the fault tolerance and resiliency framework can use a sliding window approach for checking a network device status against the particular threshold with the event count, which means that the history of events seen before the defined N interval will be erased; and the threshold validation is performed with event count only within the defined N interval.

For example, in accordance with an embodiment, the system can maintain a database, for each error with the timestamp the error was seen in the past N time interval.

Figure 5:
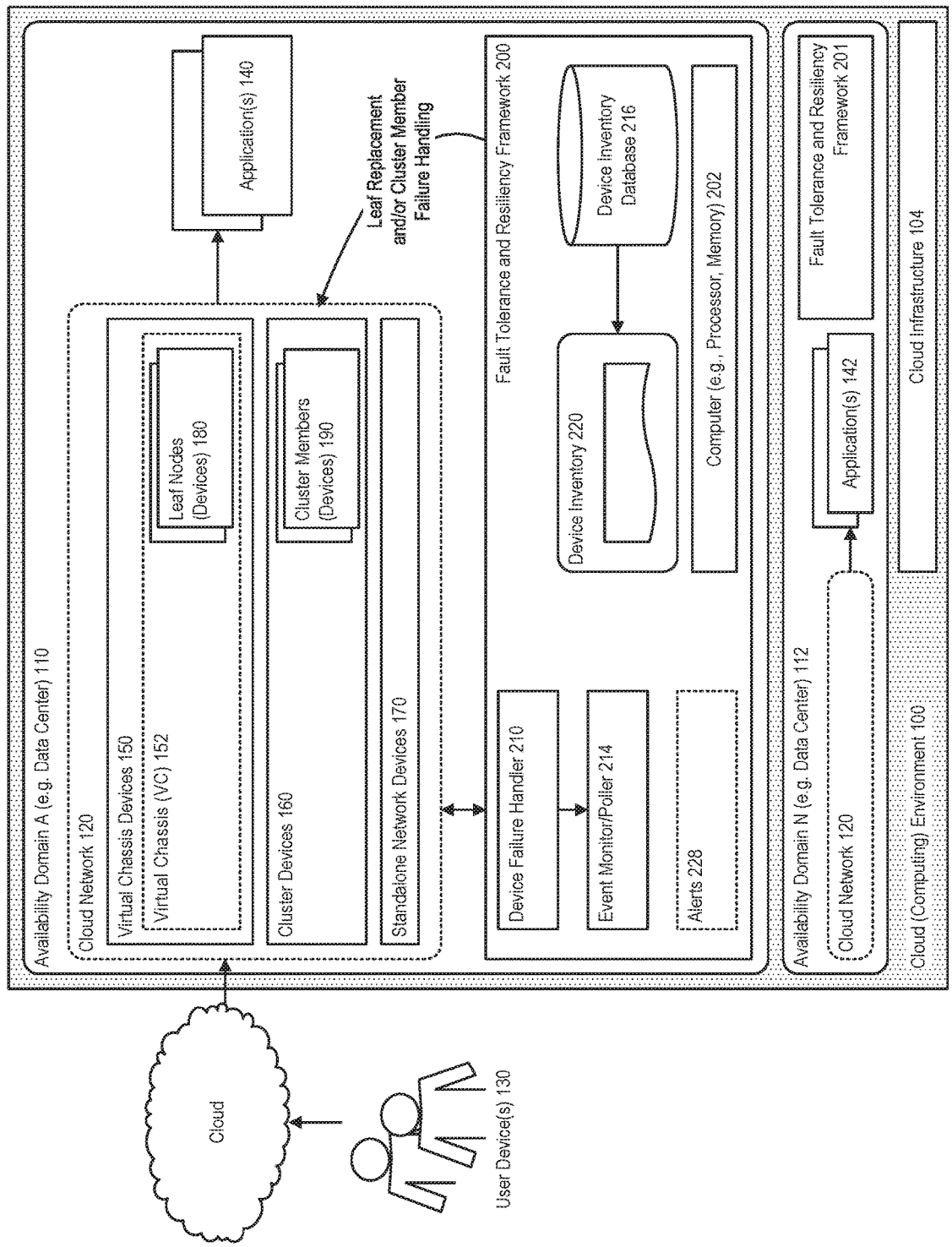
FIG. 5 illustrates the operation of the system to provide fault tolerance and resiliency in a cloud network, in accordance with an embodiment.

FIG. 5 illustrates the operation of the system to provide fault tolerance and resiliency in a cloud network, in accordance with an embodiment.

As illustrated in FIG. 5, in accordance with an embodiment, when a virtual chassis appears to have gone down, the system can attempt a leaf node replacement. For example, the system can periodically check to see if there is any nonresponsive network device. Since virtual chassis and cluster members generally use a heartbeat mechanism to talk to one another, the system can check heartbeats and monitor them. Each device vendor provides an API that allows monitoring of their network devices, and heartbeats can be monitored using these APIs, to enable the system to detect a problem.

For example, in accordance with an embodiment, if one virtual chassis card is not present, and another is present; the system can perform operations to replace the non-present virtual chassis card with the present virtual chassis card. Generally described, a status of "not present" means the card lost the connection with the control module; while a status of "present" means the card is not active, but is in connection with the control module. In such a scenario the system can perform operations to change the cards status from "present" to "provisioned".

Since each of which network devices can be associated with a network device type, vendor, or model information, as indicated in the device inventory database, the system can determine which commands to use for which vendor type.

In accordance with an embodiment, a particular virtual chassis must generally include devices of the same vendor type within that particular virtual chassis. However, the cloud network can utilize multiple types of virtual chassis, each having different vendors/devices. The device inventory database can include different types of virtual chassis, for use in determining command types associated with the different types of virtual chassis.

In accordance with an embodiment, the contents of the database and inventory can be updated periodically, for example daily, which further assists in providing resiliency and fault tolerance.

Figure 6:
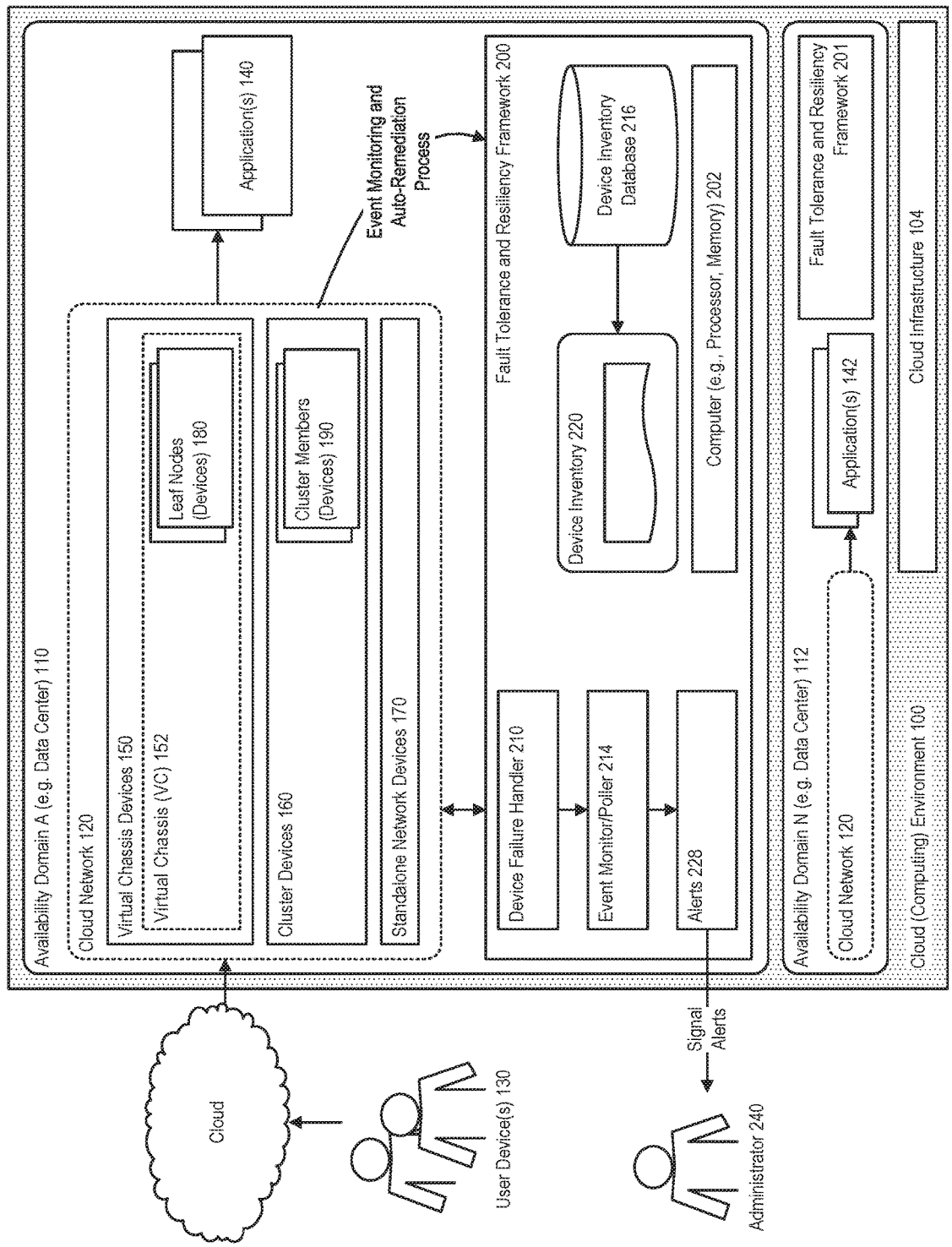
FIG. 6 further illustrates the operation of the system to provide fault tolerance and resiliency in a cloud network, in accordance with an embodiment.

FIG. 6 further illustrates the operation of the system to provide fault tolerance and resiliency in a cloud network, in accordance with an embodiment.

As illustrated in FIG. 6, in accordance with an embodiment, in the event the system determines a failure or error associated with a network device, it can attempt recovery operations to restore the cloud network to its original capacity or state. If the system subsequently determines that a particular network device cannot recover from the failure or error, it can communicate or otherwise signal an alert to an administrator 240 for further action.

Figure 7:
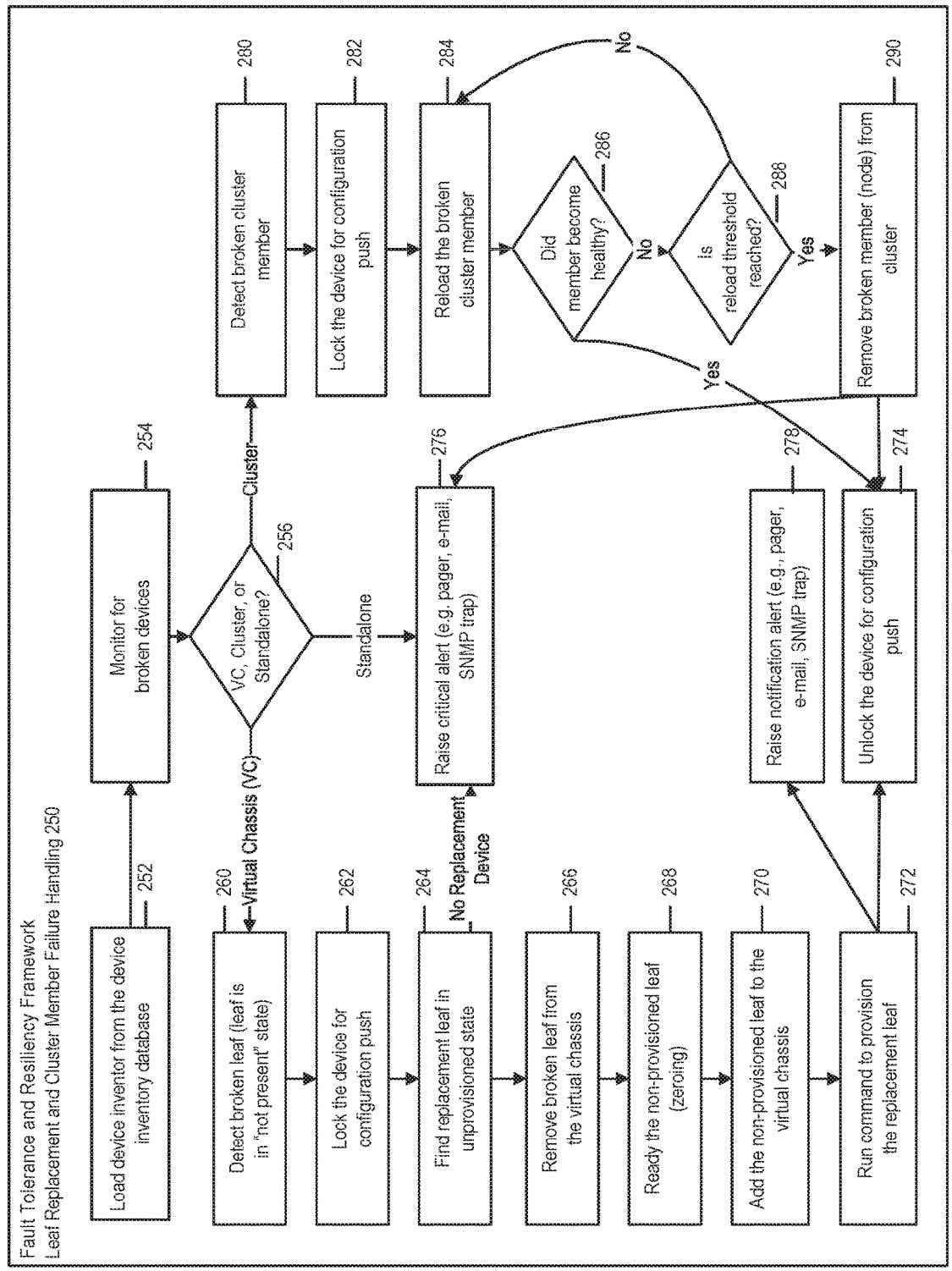
FIG. 7 illustrates a method or process for providing fault tolerance and resiliency in a cloud network, in accordance with an embodiment.

FIG. 7 illustrates a method or process for providing fault tolerance and resiliency in a cloud network, in accordance with an embodiment.

In accordance with an embodiment, generally described the fault tolerance and resiliency framework, including components such as the device failure handler, and the event monitor/poller, can be provided as one or more automated software components running on a server in the cloud, where it can operate like a daemon that monitors each network device.

For example, in accordance with an embodiment, if the fault tolerance and resiliency framework tries to check the status of a network device, and there is no acknowledgment from the device, then it can proceed to perform device-type commands to bring up another network device. Such errors may be due to, for example, a bad line card, or a bad fan, which causes the network device to start malfunctioning, or other types of errors, for example ASIC errors, or software errors.

As illustrated in FIG. 7, in accordance with an embodiment, the system (fault tolerance and resiliency framework) can operate a leaf node replacement and cluster member failure handling process 250 that includes: loading the device inventory database (252); monitoring for broken devices (254); and determining if the device is a virtual chassis, cluster, or standalone device (256).

In accordance with an embodiment, if the fault tolerance and resiliency framework determines the device is a virtual chassis device, then the system can perform device-type commands to proceed to determine any broken leaf node (i.e., the leaf node is in a "not present" state) (260). If such a broken leaf node is found, then the device is locked for configuration push (262).

In accordance with an embodiment, the process can proceed to perform device-type commands to find a replacement leaf node in an unprovisioned state (264). If no replacement device is found then a critical alert (e.g., pager, e-mail, or SNMP trap) can be raised (276). The process can then remove the broken leaf node from the virtual chassis (266); and ready the non-provisioned leaf node, e.g., by zeroing (268).

In accordance with an embodiment, the process can proceed to perform device-type commands to add the non-provisioned leaf node to the virtual chassis (270); and run a command to provision the replacement leaf node (272). The process can then unlock the device for configuration push (274); and raise a notification alert (e.g., pager, e-mail, or SNMP trap) (278).

As illustrated in FIG. 7, in accordance with an embodiment, if instead the fault tolerance and resiliency framework determines the device is a cluster member, then the system (fault tolerance and resiliency framework) can proceed to detect the broken cluster member (280); and lock the device for configuration push (282).

In accordance with an embodiment, the process can perform device-type commands to attempt to reload the broken cluster member (284). If the member becomes healthy (286), then the system can unlock the device for configuration push. Alternatively, if the member does not become healthy then, the system evaluates if a reload threshold has been reached (288); and if not then will re-attempt the operation. Otherwise, the system removes the broken member/node from the cluster (290), and raises a critical alert.

Figure 8:
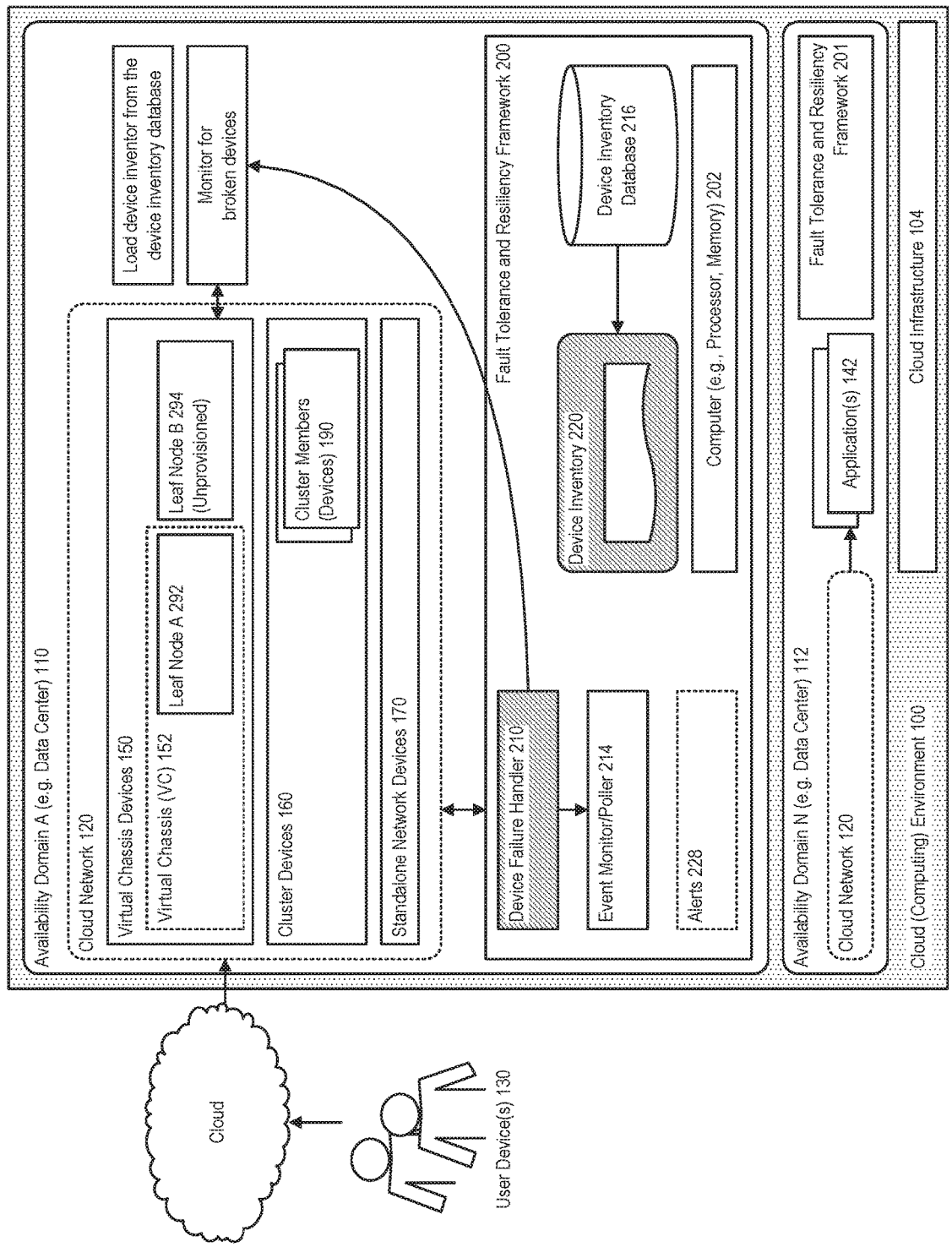
FIG. 8 illustrates the use of the method or process for providing fault tolerance and resiliency in a cloud network, in accordance with an embodiment.

FIG. 8 illustrates the use of the method or process for providing fault tolerance and resiliency in a cloud network, in accordance with an embodiment.

As illustrated in FIG. 8, in accordance with an embodiment, the virtual chassis devices (150) include, in this example, a first leaf node A 292, which is initially operational within the virtual chassis (152); and a second leaf node B 294, which is initially in an unprovisioned state. The system (fault tolerance and resiliency framework) can operate a leaf node replacement and cluster member failure handling process that includes loading the device inventory database, and monitoring for broken virtual chassis devices.

Figure 9:
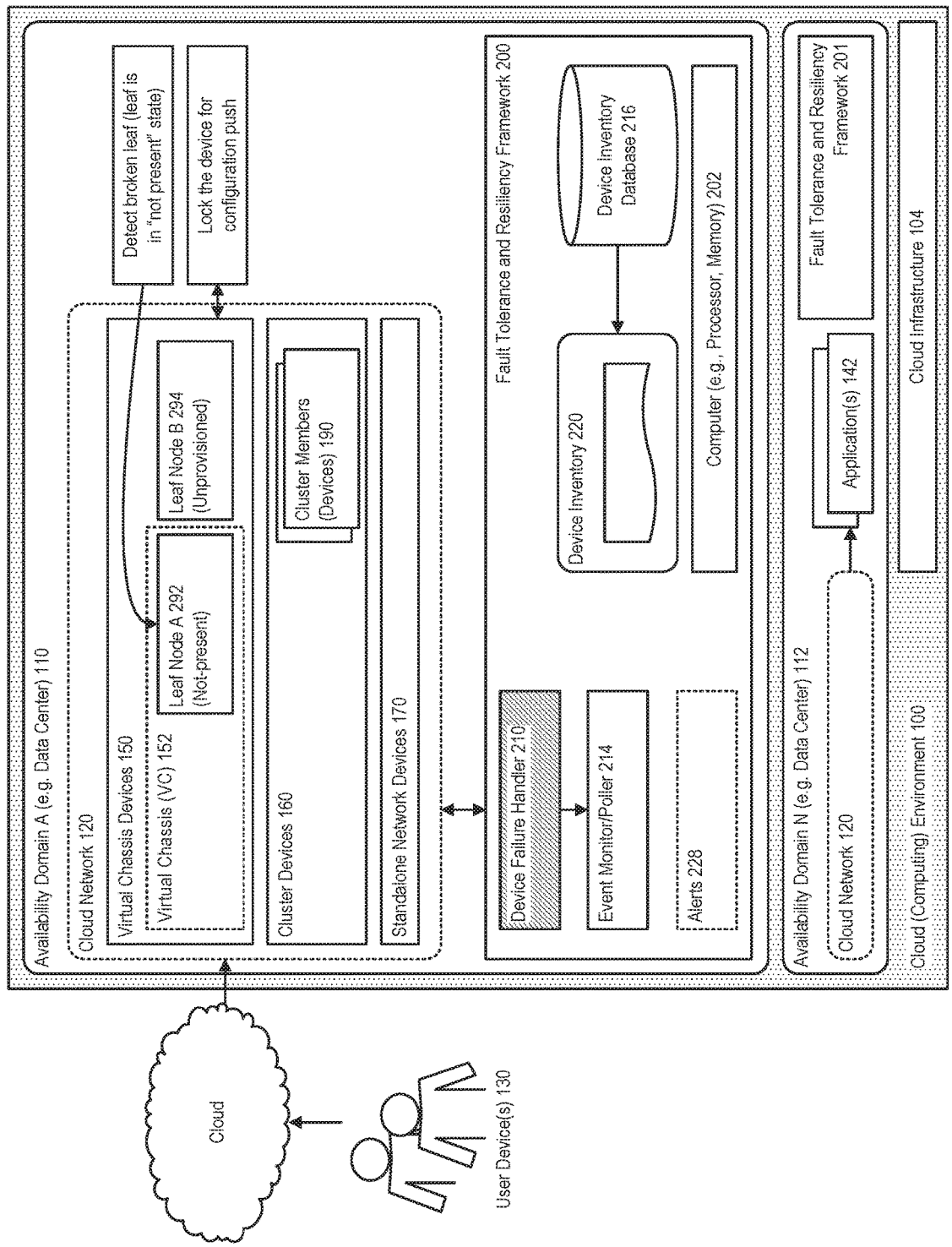
FIG. 9 further illustrates the use of the method or process for providing fault tolerance and resiliency in a cloud network, in accordance with an embodiment.

FIG. 9 further illustrates the use of the method or process for providing fault tolerance and resiliency in a cloud network, in accordance with an embodiment.

As illustrated in FIG. 9, in accordance with an embodiment, if the system determines a broken leaf node, for example, that leaf node A is found in a "not present" state, then the device is locked for configuration push.

Figure 10:
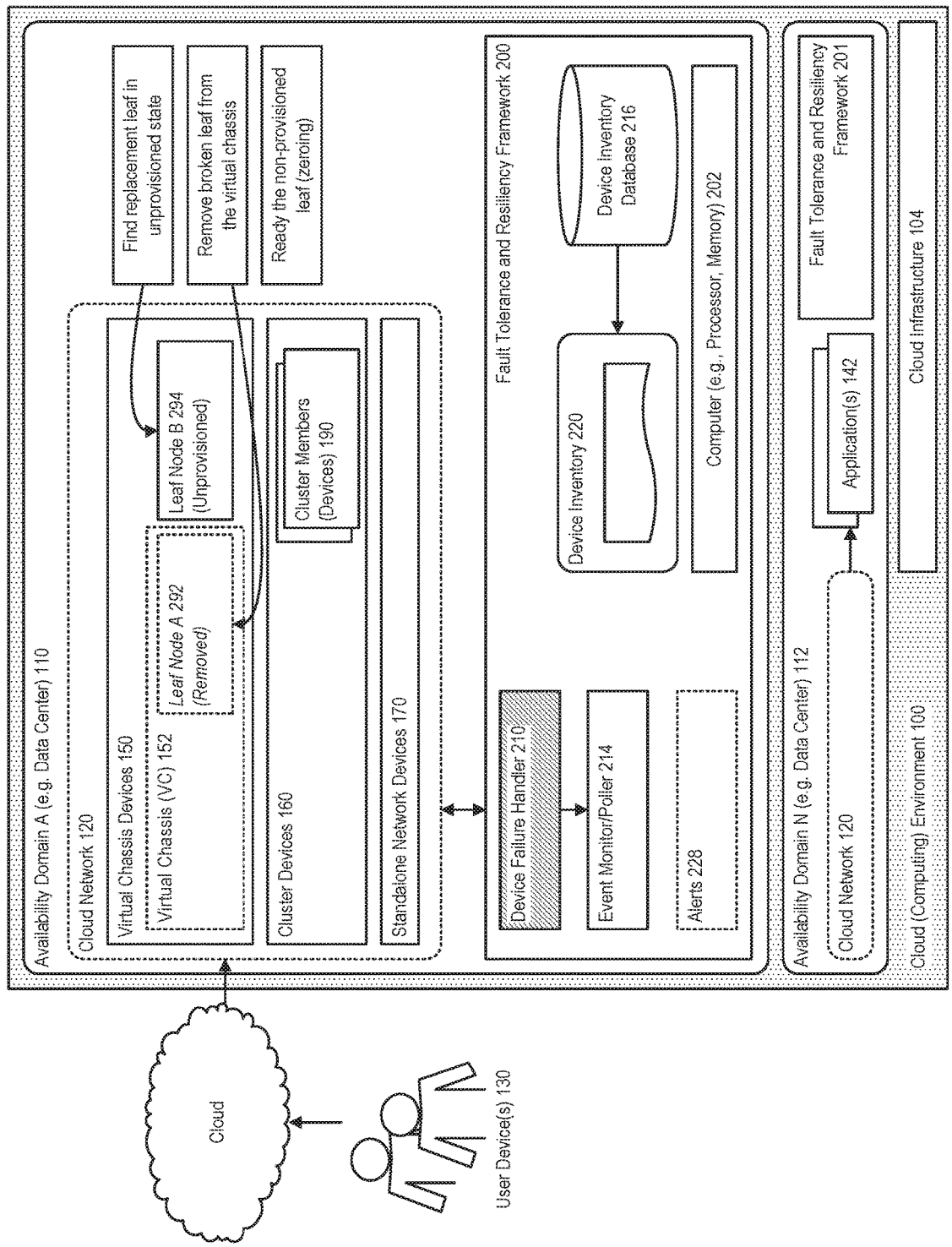
FIG. 10 further illustrates the use of the method or process for providing fault tolerance and resiliency in a cloud network, in accordance with an embodiment.

FIG. 10 further illustrates the use of the method or process for providing fault tolerance and resiliency in a cloud network, in accordance with an embodiment.

As illustrated in FIG. 10, in accordance with an embodiment, the process can proceed to find a replacement leaf node, in this example leaf node B, in an unprovisioned state; remove the broken leaf node A from the virtual chassis; and ready the non-provisioned leaf node B, for example by zeroing.

Figure 11:
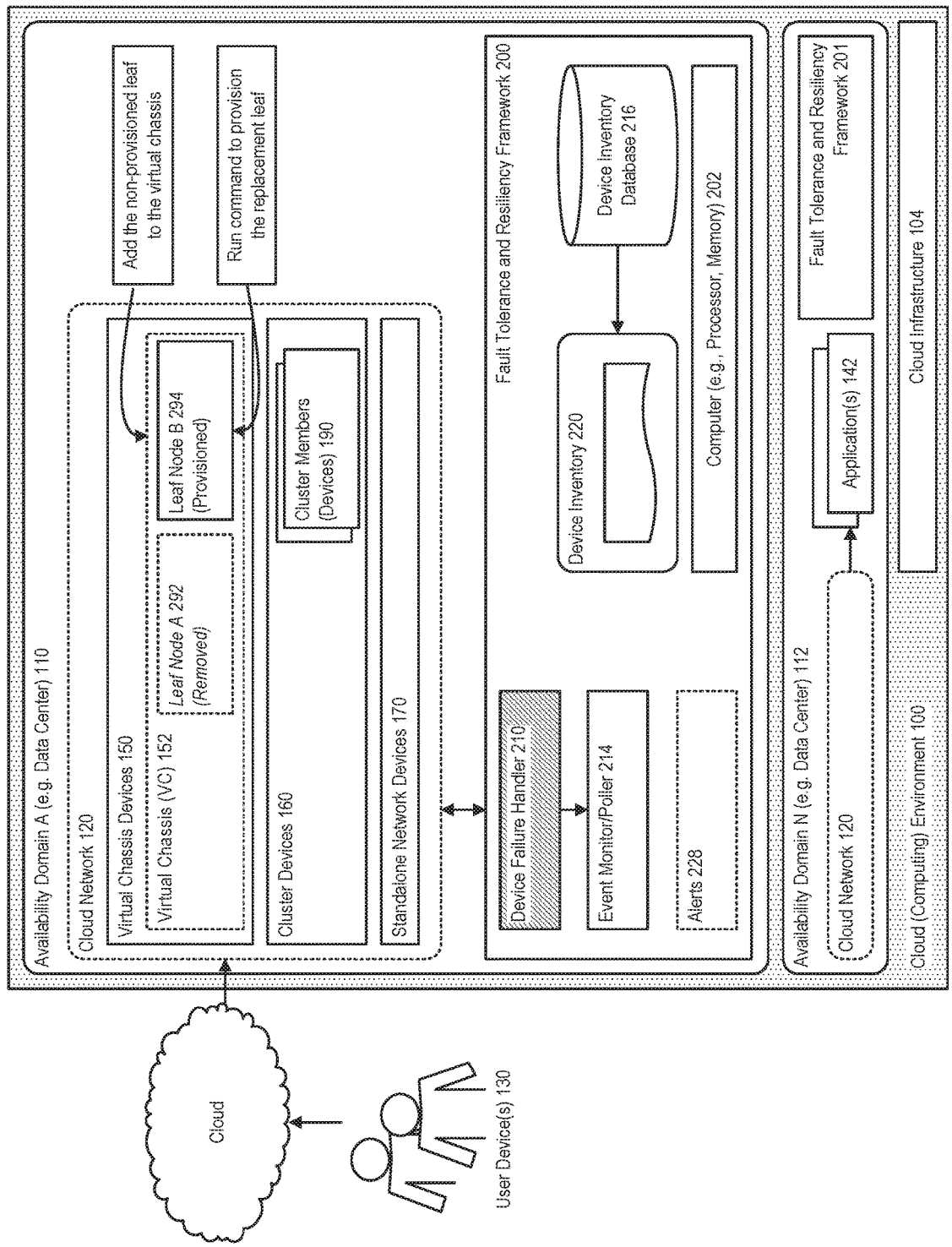
FIG. 11 further illustrates the use of the method or process for providing fault tolerance and resiliency in a cloud network, in accordance with an embodiment.

FIG. 11 further illustrates the use of the method or process for providing fault tolerance and resiliency in a cloud network, in accordance with an embodiment.

As illustrated in FIG. 11, in accordance with an embodiment, the process can proceed to add the non-provisioned leaf node B to the virtual chassis; and run a command to provision the replacement leaf node.

Figure 12:
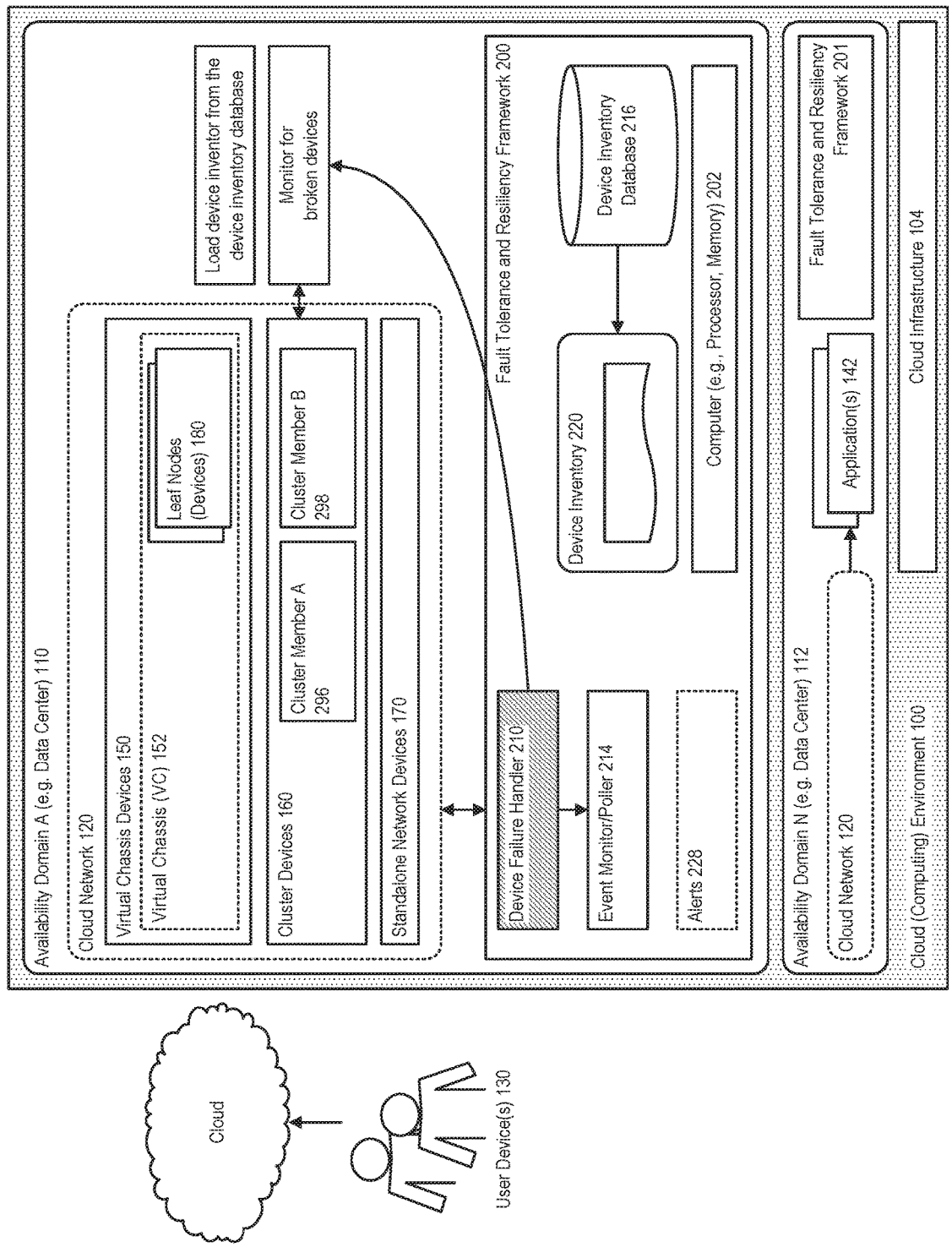
FIG. 12 further illustrates the use of the method or process for providing fault tolerance and resiliency in a cloud network, in accordance with an embodiment.

FIG. 12 further illustrates the use of the method or process for providing fault tolerance and resiliency in a cloud network, in accordance with an embodiment.

As illustrated in FIG. 12, in accordance with an embodiment, the system (fault tolerance and resiliency framework) can operate a leaf node replacement and cluster member failure handling process that includes loading the device inventory database, and monitoring for broken devices, including cluster devices. In this example, the cluster devices include a first cluster member A 296, and a second cluster member B 298, both of which are initially operational.

Figure 13:
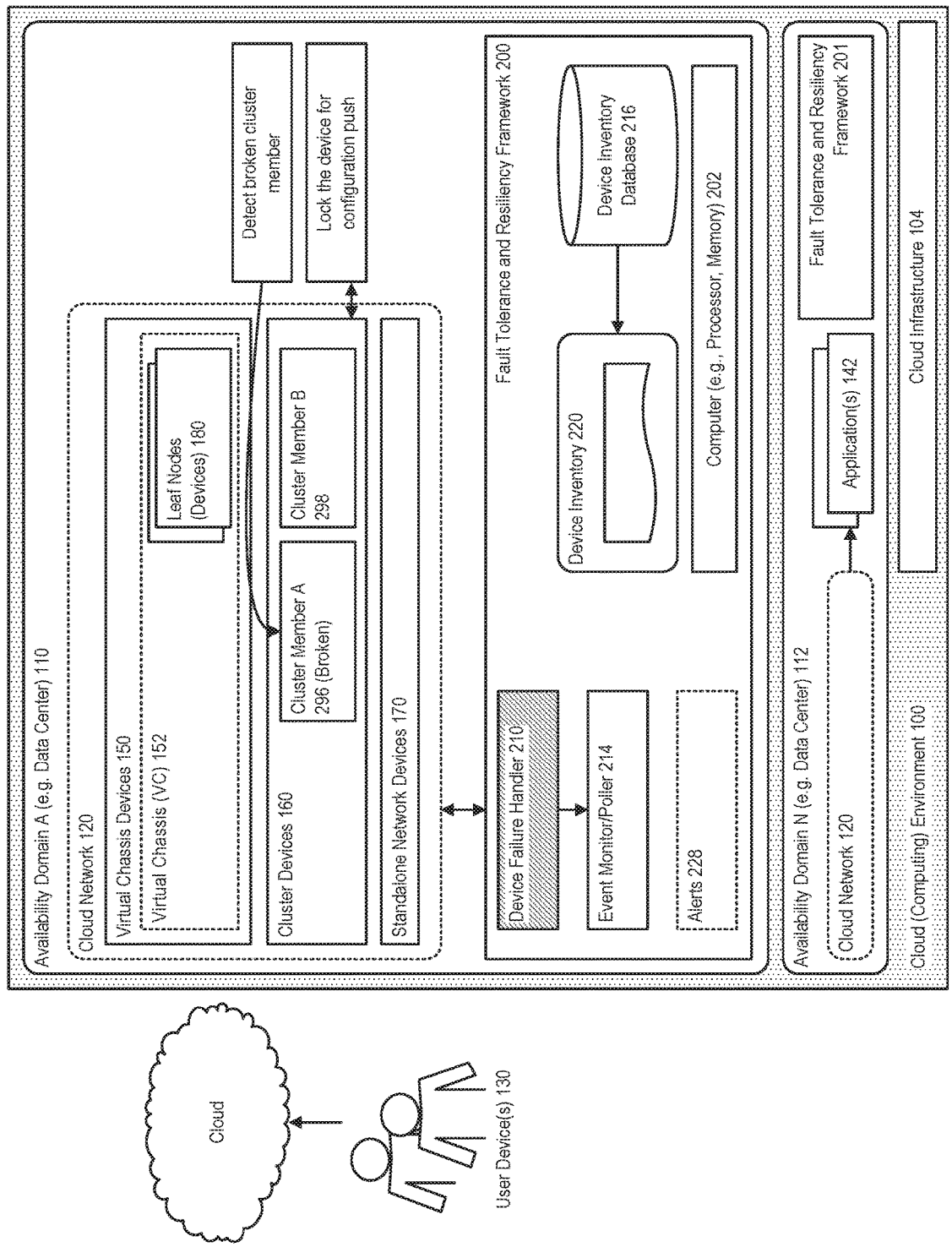
FIG. 13 further illustrates the use of the method or process for providing fault tolerance and resiliency in a cloud network, in accordance with an embodiment.

FIG. 13 further illustrates the use of the method or process for providing fault tolerance and resiliency in a cloud network, in accordance with an embodiment.

As illustrated in FIG. 13, in accordance with an embodiment, upon detecting a broken cluster member, in this example cluster member A, the system can lock the device for configuration push.

Figure 14:
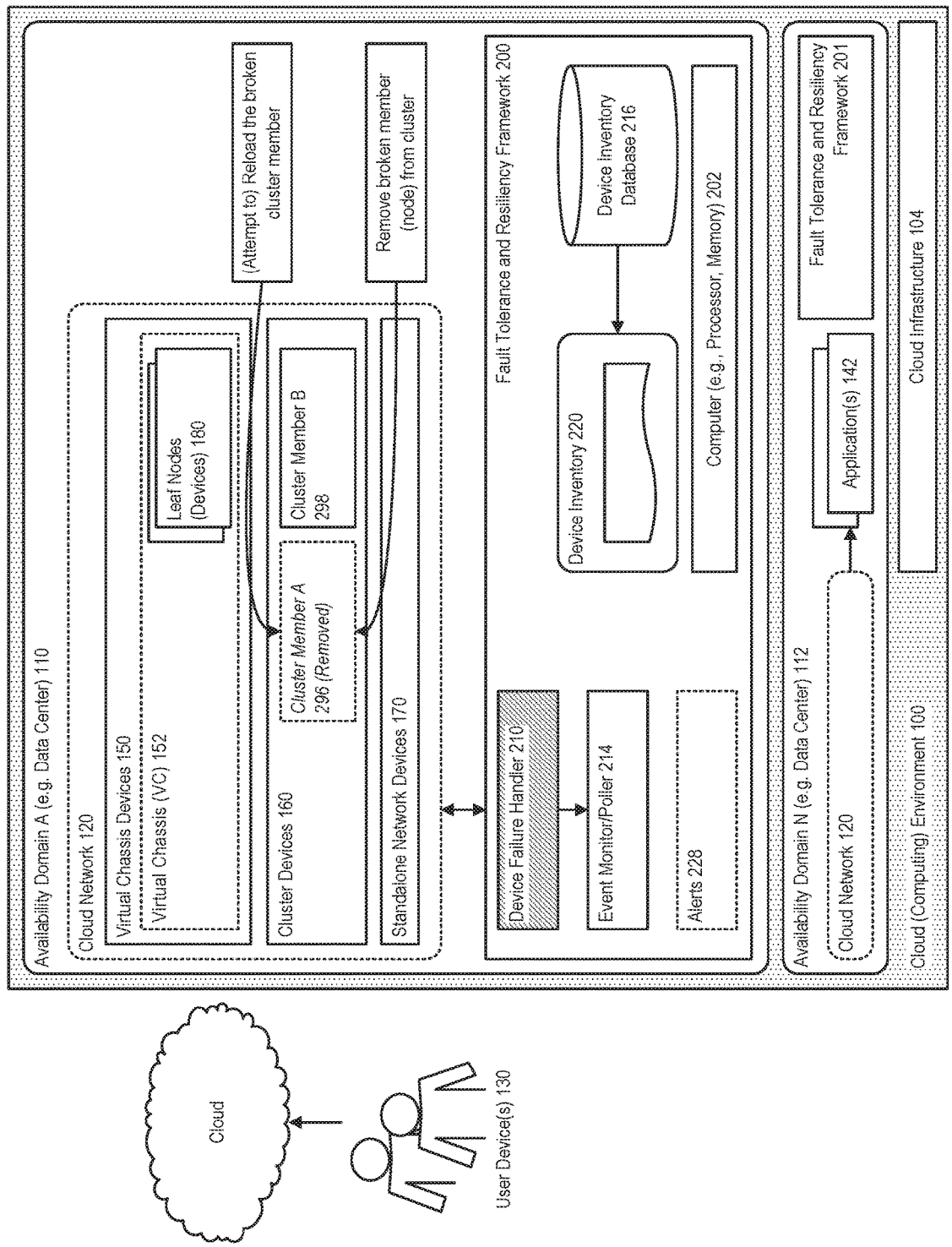
FIG. 14 further illustrates the use of the method or process for providing fault tolerance and resiliency in a cloud network, in accordance with an embodiment.

FIG. 14 further illustrates the use of the method or process for providing fault tolerance and resiliency in a cloud network, in accordance with an embodiment.

Figure 15:
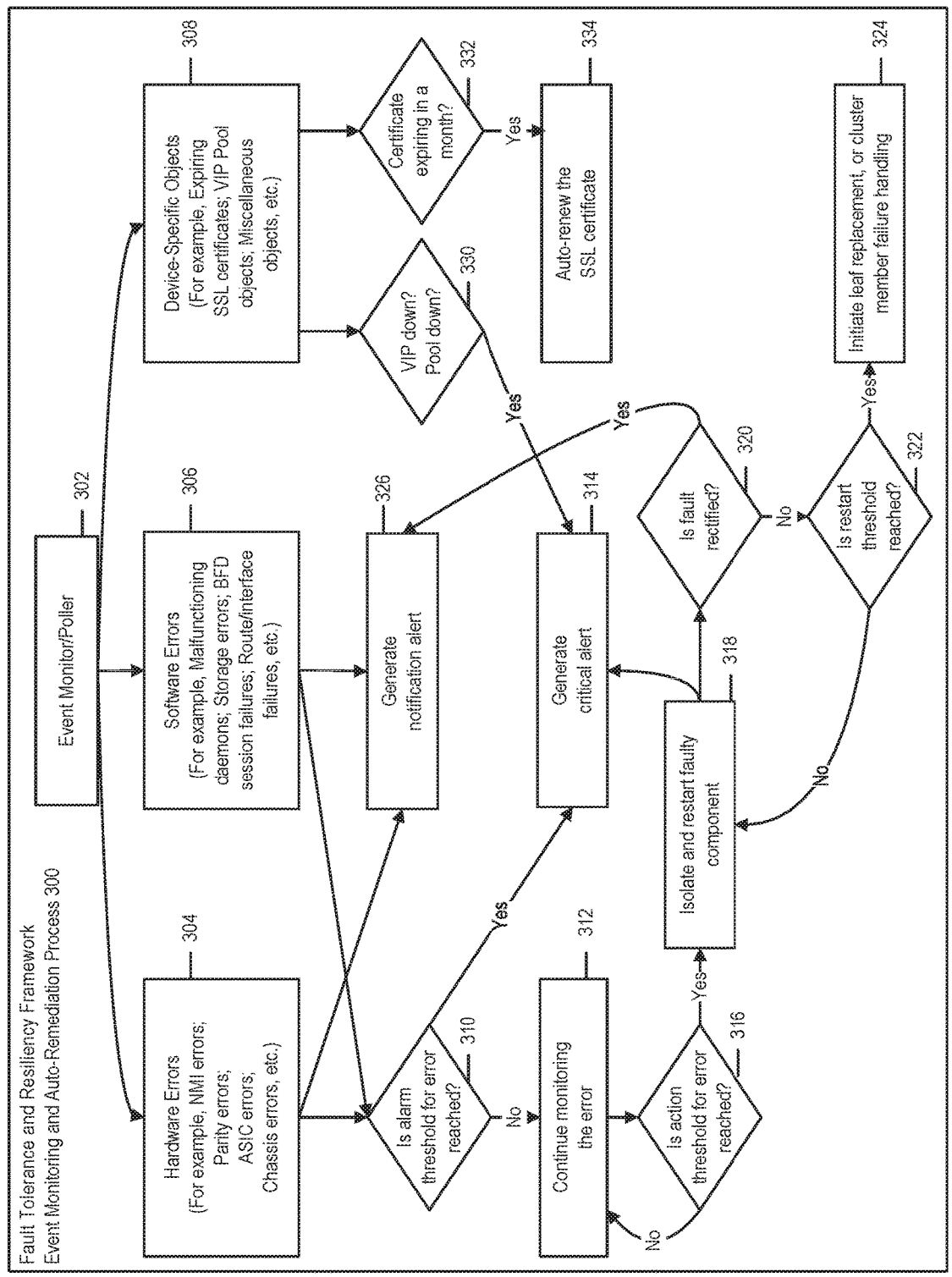
FIG. 15 illustrates a method or process performed by an event monitor/poller to determine hardware or software errors, or device-specific objects, in accordance with an embodiment.

As illustrated in FIG. 14, in accordance with an embodiment, the system can attempt to reload the broken cluster member; and if the member does not become healthy or a reload threshold has been reached; the system removes the broken member/node from the cluster FIG. 15 illustrates a method or process performed by an event monitor/poller to determine hardware or software errors, or device-specific objects, in accordance with an embodiment.

In accordance with an embodiment, generally described the system can monitor for various failures or errors, and then apply thresholds to determine how to proceed. An administrator can configure at what point the system should signal an alarm, for example via an e-mail, or an SNMP trap, which tells the administrator about faulty hardware in the switch for example.

For example, in accordance with an embodiment, the system can be configured to poll for error every 5 minutes, and if the last two times an error occurs, then that error is flagged; but perhaps if the error is less frequent then the system will not flag; or in the case of a restart threshold, the system can be configured to assess if it is detecting a reset 3 out of 5 times, and if so it can then reset the ASIC to try and fix the problem. A similar approach can be applied to any component that is faulty, for example to reload/reboot the network device. For example, an action threshold for a virtual chassis may include bringing in another member that is healthier; or for a cluster deleting the member/node from the cluster.

In accordance with an embodiment, each of the thresholds can be associated with a ratio of times the system sees the problem before taking the appropriate action. This allows the administrator to have control as to how to address the situation by making various/different attempts until the issue is escalated, and provides an incremental approach to addressing and fixing hardware and software errors.

As illustrated in FIG. 15, in accordance with an embodiment, the event monitoring and auto-remediation process 300 provided by the fault tolerance and resiliency framework can be performed by an event monitor/poller (302) as described above, that operates to determine hardware errors (304), such as for example NMI errors, parity errors, ASIC errors, chassis errors; software errors (306), such as for example malfunctioning daemons, storage errors, session failures, route/interface failures; or changes in states associated with device-specific objects (308) such as for example expiring SSL certificates, VIPs, pool objects, or miscellaneous objects.

In accordance with an embodiment, for a hardware error, the process can include determining if an alarm threshold for error is reached (310); and if so then generating a critical alert (314); otherwise continue monitoring the error (312). If the action threshold for error reached (316), then isolate and restart faulty component (318). The system can make a determination if the fault is rectified (320); and if so then generate notification alert (326). Otherwise, a determination is made as to whether a restart threshold is reached (322); and if so then initiate leaf node replacement and cluster member/node failure handling (324).

In accordance with an embodiment, software errors can generate notification alert. Examples of device-specific objects can include, for example, VIP down, or pool down (320), in which case generate a critical alert; or whether a certificate is expiring (332) in which case the system can perform an attempt to auto-renew the SSL certificate (334).

For example, in the case of an expired SSL certificate the system can automate the process of reviewing and acting on certificates that are expiring, and automating renewals, to alleviate the burden off the administrator.

Figure 16:
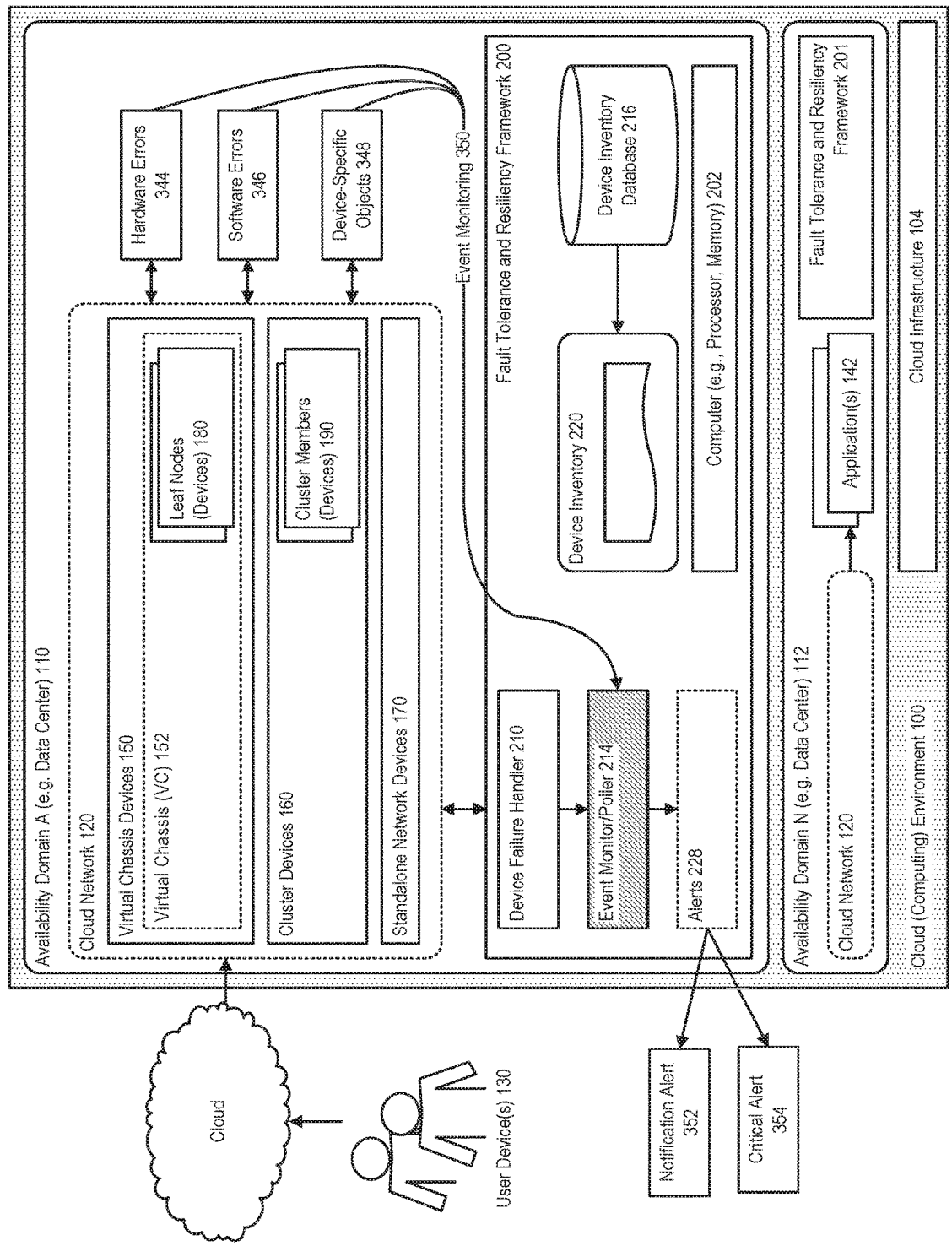
FIG. 16 illustrates use of an event monitor/poller to determine hardware or software errors, or device-specific objects, in accordance with an embodiment.

FIG. 16 illustrates use of an event monitor/poller to determine hardware or software errors, or device-specific objects, in accordance with an embodiment.

As illustrated in FIG. 16, in accordance with an embodiment, the system (event monitor/poller) operates to determine hardware errors 344, software errors 346, or device-specific objects 348 associated with the network devices in the cloud network; and based on such event monitoring 350, perform remediation tasks as described above, and generate appropriate notification alerts 352 and/or critical alerts 354.

Technical Advantages

In accordance with various embodiments, technical advantages of the systems and methods described herein can include, for example:

A fault tolerance and resiliency framework adapted to monitor and remediate faults spanning potentially thousands of network devices, with a vast number of underlying components.

The fault tolerance and resiliency framework is tightly-coupled to achieve fault tolerance, resiliency and monitoring. A single component failure can be addressed at a component level, and if not fixed then a fault-tolerant action can be percolated to the network device and upward in terms of network granularity.

The fault tolerance and resiliency framework can operate autonomously, to automatically perform corrective actions for many correctable issues.

The fault tolerance and resiliency framework can be extended, for example with plugins associated with heterogeneous network devices and network device vendors, to support additional types of network device, component, object, or software errors.

The fault tolerance and resiliency framework can use stateful processes to provide resiliency. States can be highly correlated from individual components up to an entire availability domain, and can be used to build predictable fault tolerant networks. The system can also be extended to include support for artificial intelligence techniques.

In accordance with various embodiments, the teachings herein can be implemented using one or more general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing fault tolerance and resiliency in a cloud network, comprising:
    a computer including a processor and a fault tolerance and resiliency framework operating therein that monitors network devices within a cloud network, to receive status or state information associated with the network devices;
    wherein the cloud network provides access by a cloud environment to software applications executing within an availability domain of the cloud environment;
    wherein particular network devices can be configured as virtual chassis devices, cluster members, or standalone network devices; and
    wherein the system provides a fault tolerance and resiliency framework that includes a device inventory database and a device failure handler and that monitors the network devices, and if a failure or error associated with a network device is determined, attempts recovery operations on the network device, to restore the cloud network to an original capacity or state;
    wherein in response to the fault tolerance and resiliency framework determining within the network devices at least one of a broken node or a broken cluster member, then the system performs device-type commands, as indicated by the device failure handler, to:
        lock the network device for configuration push, and at least one of:
        determine a replacement leaf node, remove the broken leaf node, and add and provision the replacement leaf node; or
        attempt to reload the broken cluster member.

2. The system of claim 1, wherein for a virtual chassis device, if the system determines a broken leaf node, then the system performs device-type commands to:
    lock the device for configuration push;
    determine a replacement leaf node;
    remove the broken leaf node from the virtual chassis;
    prepare the non-provisioned replacement leaf node; and
    add the replacement leaf node to the virtual chassis, and provision the replacement leaf node.

3. The system of claim 1, wherein for a network device that includes cluster members, upon detecting a broken cluster member, the system performs device-type commands to:
lock the device for configuration push;
attempt to reload the broken cluster member; and
if the member does not become healthy or a reload threshold has been reached, remove the broken member from the cluster.

4. The system of claim 1, wherein the system operates to determine hardware errors, software errors, or device-specific objects associated with the network devices in the cloud network; and
based on such event monitoring, performs remediation tasks and generates appropriate notification alerts and/or critical alerts.

5. A method for providing fault tolerance and resiliency in a cloud network, comprising:
monitoring, by a fault tolerance and resiliency framework including a device inventory database and a device failure handler, network devices within a cloud network, to receive status or state information associated with the network devices;
wherein the cloud network provides access by a cloud environment to software applications executing within an availability domain of the cloud environment;
wherein particular network devices can be configured as virtual chassis devices, cluster members, or standalone network devices; and
in the event of determining a failure or error associated with a network device, attempting recovery operations on the network device, to restore the cloud network to an original capacity or state, including in response to the fault tolerance and resiliency framework determining within the network devices at least one of a broken node or a broken cluster member, performing device-type commands, as indicated by the device failure handler, to:
lock the network device for configuration push, and at least one of:
determine a replacement leaf node, remove the broken leaf node, and add and provision the replacement leaf node; or
attempt to reload the broken cluster member.

6. The method of claim 5, wherein for a virtual chassis device, if the system determines a broken leaf node, then the system performs device-type commands to:
lock the device for configuration push;
determine a replacement leaf node;
remove the broken leaf node from the virtual chassis;
prepare the non-provisioned replacement leaf node; and
add the replacement leaf node to the virtual chassis, and provision the replacement leaf node.

7. The method of claim 5, wherein for a network device that includes cluster members, upon detecting a broken cluster member, the system performs device-type commands to:
lock the device for configuration push;
attempt to reload the broken cluster member; and
if the member does not become healthy or a reload threshold has been reached, remove the broken member from the cluster.

8. The method of claim 5, wherein the system operates to determine hardware errors, software errors, or device-specific objects associated with the network devices in the cloud network; and based on such event monitoring, performs remediation tasks and generates appropriate notification alerts and/or critical alerts.

9. A non-transitory computer readable storage medium, including instructions stored thereon which when read and executed by at least one of a computer or other electronic network device causes the at least one of a computer or other electronic network device to perform a method comprising:
monitoring, by a fault tolerance and resiliency framework including a device inventory database and a device failure handler, network devices within a cloud network, to receive status or state information associated with the network devices;
wherein the cloud network provides access by a cloud environment to software applications executing within an availability domain of the cloud environment;
wherein particular network devices can be configured as virtual chassis devices, cluster members, or standalone network devices; and
in the event of determining a failure or error associated with a network device, attempting recovery operations on the network device, to restore the cloud network to an original capacity or state, including in response to the fault tolerance and resiliency framework determining within the network devices at least one of a broken node or a broken cluster member, performing device-type commands, as indicated by the device failure handler, to:
lock the network device for configuration push, and at least one of:
determine a replacement leaf node, remove the broken leaf node, and add and provision the replacement leaf node; or
attempt to reload the broken cluster member.

10. The non-transitory computer readable storage medium of claim 9, wherein for a virtual chassis device, if the system determines a broken leaf node, then the system performs device-type commands to:
lock the device for configuration push;
determine a replacement leaf node;
remove the broken leaf node from the virtual chassis;
prepare the non-provisioned replacement leaf node; and
add the replacement leaf node to the virtual chassis, and provision the replacement leaf node.

11. The non-transitory computer readable storage medium of claim 9, wherein for a network device that includes cluster members, upon detecting a broken cluster member, the system performs device-type commands to:
lock the device for configuration push;
attempt to reload the broken cluster member; and
if the member does not become healthy or a reload threshold has been reached, remove the broken member from the cluster.

12. The non-transitory computer readable storage medium of claim 9, wherein the system operates to determine hardware errors, software errors, or device-specific objects associated with the network devices in the cloud network; and based on such event monitoring, performs remediation tasks and generates appropriate notification alerts and/or critical alerts.

* * * * *

UNITED STATES PATENT AND TRADEMARK OFFICE
CERTIFICATE OF CORRECTION

PATENT NO. : 11,334,453 B2
APPLICATION NO. : 16/935961
DATED : May 17, 2022
INVENTOR(S) : Mutnuru Page 1 of 1

It is certified that error appears in the above-identified patent and that said Letters Patent is hereby corrected as shown below:

In the Drawings

On sheet 1 of 16, in FIGURE 1, under Reference Numeral 156, Line 2, delete "Model" and insert -- Model) --, therefor.

On sheet 1 of 16, in FIGURE 1, under Reference Numeral 157, Line 2, delete "Model" and insert -- Model) --, therefor.

On sheet 1 of 16, in FIGURE 1, under Reference Numeral 158, Line 2, delete "Model" and insert -- Model) --, therefor.

On sheet 1 of 16, in FIGURE 1, under Reference Numeral 165, Line 2, delete "Model" and insert -- Model) --, therefor.

On sheet 1 of 16, in FIGURE 1, under Reference Numeral 166, Line 2, delete "Model" and insert -- Model) --, therefor.

On sheet 1 of 16, in FIGURE 1, under Reference Numeral 167, Line 2, delete "Model" and insert -- Model) --, therefor.

On sheet 1 of 16, in FIGURE 1, under Reference Numeral 168, Line 2, delete "Model" and insert -- Model) --, therefor.

In the Specification

In Column 6, Line 39, delete "errors" and insert -- errors. --, therefor.

In Column 10, Line 21, delete "cluster" and insert -- cluster. --, therefor.

Signed and Sealed this
Third Day of January, 2023

Katherine Kelly Vidal

Katherine Kelly Vidal
*Director of the United States Patent and Trademark Office*